(12) United States Patent
Lin et al.

(10) Patent No.: US 10,313,111 B2
(45) Date of Patent: *Jun. 4, 2019

(54) KEY PROTECTING METHOD AND APPARATUS

(71) Applicant: DATA ASSURANCE AND COMMUNICATION SECURITY RESEARCH CENTER, CHINESE ACADEMY OF SCIENCES, Beijing (CN)

(72) Inventors: Jingqiang Lin, Beijing (CN); Le Guan, Beijing (CN); Qiongxiao Wang, Beijing (CN); Jing Wang, Beijing (CN); Jiwu Jing, Beijing (CN)

(73) Assignee: DATA ASSURANCE AND COMMUNICATION SECURITY RESEARCH CENTER, CHINESE ACADEMY OF SCIENCES, Beijing (CN)

( * ) Notice: Subject to any disclaimer, the term of this patent is extended or adjusted under 35 U.S.C. 154(b) by 44 days.

This patent is subject to a terminal disclaimer.

(21) Appl. No.: 14/909,849

(22) PCT Filed: Aug. 27, 2014

(86) PCT No.: PCT/CN2014/085236
§ 371 (c)(1),
(2) Date: Feb. 3, 2016

(87) PCT Pub. No.: WO2015/127772
PCT Pub. Date: Sep. 3, 2015

(65) Prior Publication Data
US 2016/0359621 A1 Dec. 8, 2016

(30) Foreign Application Priority Data
Feb. 27, 2014 (CN) .......................... 2014 1 0068010

(51) Int. Cl.
*G06F 11/30* (2006.01)
*G06F 12/14* (2006.01)
(Continued)

(52) U.S. Cl.
CPC ............ *H04L 9/0822* (2013.01); *G06F 9/467* (2013.01); *G06F 12/0806* (2013.01); *H04L 9/14* (2013.01);
(Continued)

(58) Field of Classification Search
CPC ........... H04L 9/0822; H04L 9/14; H04L 9/30; H04L 9/32; H04L 9/3226; G06F 9/467;
(Continued)

(56) References Cited

U.S. PATENT DOCUMENTS

2005/0105738 A1* 5/2005 Hashimoto ............. G06F 21/72
380/277
2006/0015748 A1* 1/2006 Goto ....................... G06F 21/52
713/190
(Continued)

FOREIGN PATENT DOCUMENTS

CN 1822217 A 8/2006
CN 102355350 A 2/2012
(Continued)

OTHER PUBLICATIONS

Chinese Office Action for Application No. 201410068010.9 dated Oct. 10, 2017, and an English concise explanation of relevance thereof.
(Continued)

*Primary Examiner* — Kambiz Zand
*Assistant Examiner* — Arezoo Sherkat
(74) *Attorney, Agent, or Firm* — Harness, Dickey & Pierce, P.L.C.

(57) ABSTRACT

An embodiment of the present disclosure provide a key protection method, via setting that each core of the multi-
(Continued)

core process may have one symmetric master key, dynamically obtaining the plaintext private key of the asymmetric algorithm via a decryption operation and using the Intel TSX, it may be ensured that the private key and the intermediate variables used in the computation process may be stored in the cache occupied by the operation core only in terms of the hardware level, which may prevent the attackers from stealing the private key from the physical memory and ensure the security of the implementation of the public-key cryptographic algorithm in the computer system.

14 Claims, 5 Drawing Sheets

(51) Int. Cl.
| | | |
|---|---|---|
| *H04L 9/08* | (2006.01) | |
| *H04L 9/32* | (2006.01) | |
| *G06F 9/46* | (2006.01) | |
| *G06F 12/0806* | (2016.01) | |
| *H04L 9/14* | (2006.01) | |
| *H04L 9/30* | (2006.01) | |

(52) U.S. Cl.
CPC ............... *H04L 9/30* (2013.01); *H04L 9/32* (2013.01); *H04L 9/3226* (2013.01); *G06F 2212/1052* (2013.01); *G06F 2212/402* (2013.01); *G06F 2212/60* (2013.01); *G06F 2212/621* (2013.01)

(58) Field of Classification Search
CPC ......... G06F 12/0806; G06F 2212/1052; G06F 2212/402; G06F 2212/60; G06F 2212/621
See application file for complete search history.

(56) References Cited

U.S. PATENT DOCUMENTS

| | | | |
|---|---|---|---|
| 2006/0149902 | A1 | 7/2006 | Yun et al. |
| 2009/0172317 | A1 | 7/2009 | Saha et al. |
| 2012/0331308 | A1* | 12/2012 | Fernandez Gutierrez .................. G06F 21/71 713/190 |
| 2014/0003602 | A1* | 1/2014 | Gueron ............... G06F 12/0875 380/44 |
| 2014/0040554 | A1 | 2/2014 | Pohlack et al. |
| 2014/0258736 | A1* | 9/2014 | Merchan ................. G06F 21/62 713/193 |
| 2015/0089159 | A1* | 3/2015 | Busaba ............... G06F 12/0817 711/144 |
| 2015/0169360 | A1* | 6/2015 | Busaba .................. G06F 9/467 711/147 |
| 2015/0310231 | A1 | 10/2015 | Lin et al. |

FOREIGN PATENT DOCUMENTS

| | | |
|---|---|---|
| CN | 103544054 A | 1/2014 |
| CN | 103607279 A | 2/2014 |
| WO | 2014004222 A1 | 1/2014 |

OTHER PUBLICATIONS

European Search Report for Application No. 14884251.1 dated Sep. 29, 2017.
International Preliminary Report for Application No. PCT/CN2014/085236 dated Sep. 9, 2016.
International Search Report for PCT/CN2014/085236, ISA/CN, Beijing, dated Dec. 4, 2014.
Chinese Office Action for Application No. 201410068010.9 dated May 8, 2018, and an English concise explanation of relevance thereof.
European Office Action for Application No. 14884251.1 dated Oct. 8, 2018.

* cited by examiner

KEY PROTECTING METHOD AND APPARATUS

CROSS-REFERENCE TO RELATED APPLICATIONS

This application is a 371 U.S. National Stage of International Application No. PCT/CN2014/085236, filed Aug. 27, 2014. This application claims the benefit of and priority to Chinese Patent Application No. 201410068010.9, filed Feb. 27, 2014. The disclosures of the above applications are incorporated herein by reference.

FIELD

The present disclosure relates to a computer security field, and more particularly to a key protecting method and apparatus.

BACKGROUND

In a computer system, private data are protected with cryptography. In a public-key cryptographic algorithm, keys are generated in pairs. Each pair of keys consist of a private key and a public key. The private key is kept only by the owner. The premise for protecting private data with a public-key cryptographic algorithm is ensuring confidentiality of the private key.

Normally, in the computer system, the private key is stored and operated in a memory. However, system intrusions and physical attacks severely threaten the security of the computer system. The system intrusions utilize a software bug of the system and directly obtain the private key via memory access instructions. The physical attacks, such as a cold boot attack, may obtain an image of the whole Random-Access Memory (RAM) chip while there is a physical access with a target computer. In order to prevent the cold boot attack, a general practice is storing the key with resources in the CPU, rather than resources in the RAM. These schemes may be classified into two categories. One kind of scheme is utilizing a register. Since the capacity of the register is limited, this scheme may only support a symmetric cryptographic algorithm and a simple asymmetric cryptographic algorithm, in which length of the key is limited. The other kind of scheme is applicable to a multi-core processor and stores the key and intermediate variables in an on-chip cache of the CPU. This kind of scheme utilizes a write back mode of the cache to clear up contents, which are newly written into the memory, before the contents are synchronized to the RAM chip and only computation results are reserved. Meanwhile, in order to eliminate influence of cache sharing, when the cryptographic computation is performed, all cores, which share the cache with the cryptographic computation core, need to be configured as a no-fill mode. In the no-fill mode, a memory access operation, which is a read miss or a write miss, does not incur replacement of the cache. It can be seen that in a situation that an L3 cache is shared by all cores of the multi-core processor, this kind of scheme supports only one core in performing the cryptographic operation at the same time. Further, when one core performs the cryptographic operation, other cores are configured as the no-fill mode, so that the processor is inefficient. Besides, as for this kind of configuration, if the Operating System (OS) has a bug, malicious processes still may directly read the keys stored in the memory via the bug, resulting in invalidity of the protection mechanism.

SUMMARY

As for the above problems in the prior art, embodiments of the present disclosure provide a key protection method and device to resist system intrusions and physical attacks on the memory to ensure security of the implementation of public-key cryptographic algorithm in the computer system and enhance efficiency of the processor.

In order to achieve the above objectives, an embodiment of the present disclosure provides a key protection method, including:

step A, setting a symmetric master key in one or multiple cores of a multi-core processor;

step B, taking any core of the multi-core processor configured with the symmetric master key as an operation core, performing a decryption operation to obtain a plaintext private key using the symmetric master key, performing a public-key cryptographic operation using the plaintext private key; the plaintext private key and intermediate variables used in the public-key cryptographic operation being stored in a cache occupied by the operation core; and step C, clearing up the plaintext private key and the intermediate variable used in the public-key cryptographic operation in the cache occupied by the operation core.

Embodiments of the present disclosure further provide a key protection device for implementing the above methods.

The key protection method provided by embodiments of the present disclosure may resist physical attacks and system intrusions. Via setting that each core of the multi-core processor may have one symmetric master key, dynamically obtaining the plaintext private key of the asymmetric algorithm via a decryption operation and using the Intel TSX, it may be ensured that the private key and the intermediate variables used in the computation process may be stored in the cache occupied by the operation core only in terms of the hardware level, which may prevent the attackers from stealing the private key from the physical memory and ensure the security of the implementation of public-key cryptographic algorithm in the computer system. Further, even the OS is compromised and the attacker may directly read the memory space storing the key, since the Intel TSX mechanism may ensure the atomicity of the submission of the memory, the attacker cannot obtain the plaintext private key. Further, in this scheme, the other cores of the multi-core processor may perform the cryptographic operation, which may enhance the operation efficiency.

DETAILED DESCRIPTION

Figure 1:
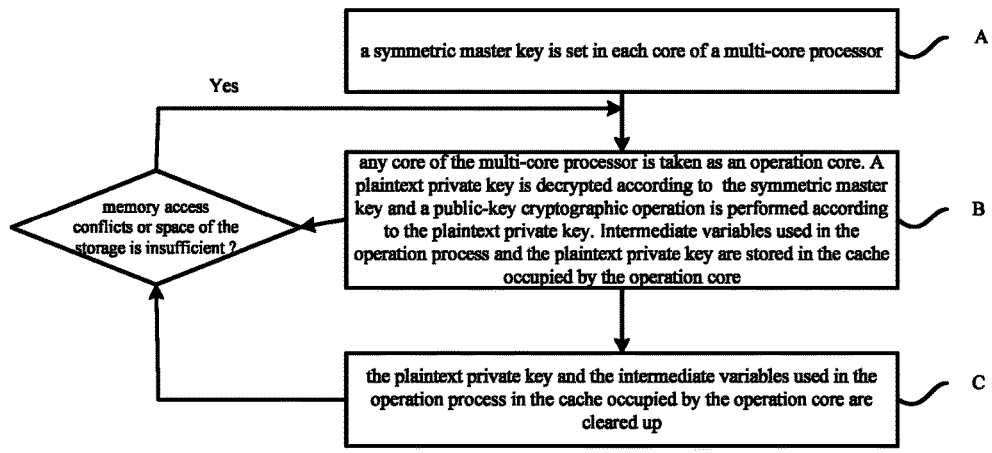
FIG. 1 is a flow chart illustrating a key protection method in accordance with an example of the present disclosure.

The present disclosure is further described in detail hereinafter with reference to the accompanying drawings to make the objective, technical solution and merits thereof more apparent.

The present disclosure may be implemented based on following considerations:

There may be various system level attacks on the memory. At present, the OS may provide some protection measures on sensitive memory space. However, if an attacker bypasses these protection measures with some bugs, the attacker may directly access the sensitive memory space and sensitive data may leak out. The present disclosure may dynamically monitor the sensitive data region via a hardware mechanism so that any direct access to the sensitive data region may be able to obtain a non-sensitive cipher text version only before sensitive data are written into the sensitive data region, which may greatly enhance the difficulty of the attacks on the memory system.

The cold boot attack, as a physical attack, may attack a physical memory module. Since the on-chip cache is generally integrated into the Central Processing Unit (CPU), a key protection process for storing the key and intermediate variables in the CPU on-chip cache proposed in the prior art is very effective. In the structure of the computer memory hierarchy, the cache is a small-capacity storage at a high speed between the CPU and a main memory. The physical cores of the CPU and caches which are occupied by the physical cores of the CPU may constitute a relatively independent environment. The storage capacity of the cache is much larger than that of the register of the CPU, may be enough to store the keys of the public-key cryptographic algorithm and to provide various algorithms of security enhancement and arithmetic acceleration. Existing literatures may implement a 4096-bit Rivest-Shamir-Adleman (RSA) operation supporting a Chinese Remainder Theorem (CRT) with this method.

However, in order to implement the above process, additional software protection mechanisms may need to be set up. If there is a bug in the OS, a malicious process may lead to invalidation of the software protection mechanism through the bug. The number of cores, which may simultaneously perform the cryptographic operation, may be influenced by the hierarchical structure of the cache. For instance, the existing CPU architecture may have a shared cache (such as L3 cache register), and this scheme may support only one core performing the cryptographic operation at the same time. Further, due to the additional software protection mechanisms, such as configuring other cores into the no-fill mode with software, which may affect the processing speed of the CPU since the other cores cannot simultaneously perform other cryptographic operation in the multi-core processor system. Another objective of the present disclosure may be preventing the cold boot attack via storing the key and intermediate variables in the CPU on-chip cache and preventing slowdown of the processing speed of the CPU.

In order to improve the efficiency of the CPU, parallel tasks should be adopted. If the parallel tasks are adopted, thread synchronization must be ensured. Transactional memory is a technology put forwarded in the prior art for solving the problem of thread synchronization. Transactional memory may allow one thread to independently finish modification of the shared memory and may neglect that there may be other threads. However, the thread may record each read and write operation on shared memory in a log. If there may be concurrent operations on the shared memory, the thread may abort all the previous operations and fall back to the beginning state of the transaction.

One representative technology of transactional memory technology may be Intel Transactional Synchronization Extensions (TSX), which may be first shipped in Intel's fourth-generation Core CPUs (i.e., Haswell architecture) to implement hardware transactional memory. The programming interface of Intel TSX may be used to enhance utilization of existing CPU multi-core in multi-threading applications.

In the conventional multi-threading programming, generally, potential data sharing may be implemented via a locking mechanism. The result is that these operations may be serialized whether the two threads simultaneously operate a same data variable or not. Fine-grain locks may have less impact on the performance. However, it may be prone to error and difficult to program. Coarse-grain locks may be easy to be implemented. However, the coarse-grain locks cannot fully utilize advantages of multi-threading, resulting in low efficiency.

The core of the Intel TSX technology is transactional memory. The procedure may take a code segment as a transactional region and all memory accesses made by the code segment may be recorded. If there is memory access conflict, abort may occur to abort all previous operations and the state of the CPU may be restored to that before entering the transactional region. Then, as for Restricted Transactional Memory (RTM), aborted operations may directly jump to a specified code area. Alternatively, as for Hardware Lock Elision (HLE), the above operations may be re-executed after locking. If there is no memory access conflict, all updates on the memory and registers may be atomically submitted. Therefore, before the update is finished, other cores may read old data only while accessing this segment of the memory. The access conflict may refer to that an external thread may read a memory address, which may have been written before in the transactional region or an external thread may write a memory address, which may have been read or written before in the transactional region. If there is memory access conflict, transaction abort may occur.

The basis for implementing transactional memory may be the cache-coherence protocol of the CPU. All memory accesses in the transactional region may occur in the cache of the operation core. If another core accesses a memory address recorded in the transactional region or the cache of the operation core should synchronize data in the cache to the memory due to insufficiency of space, the above operations may be detected by the cache-coherence protocol and aborts may occur based on the policy.

The present disclosure may ensure that the sensitive data stored in the cache, such as the plaintext private key may not be synchronized to the memory with the transactional region of the above Intel TSX technology. Since the TSX may ensure the atomicity of the memory submission, the malware attacks of the system level may be prevented.

An example of the present disclosure may provide a key protection method, which may be executed by a multi-core processor, as shown in FIG. 1.

At block A, a symmetric master key may be set in each core of a multi-core processor.

At block B, any core of the multi-core processor may be taken as an operation core. The plaintext private key may be decrypted from the symmetric master key to execute a public-key cryptographic operation. Intermediate variables used in the public-key cryptographic operation and the plaintext private key may be stored in the cache occupied by the operation core.

At block C, the plaintext private key and the intermediate variables used in the operation process in the cache occupied by the operation core may be cleared up.

In the process of executing the block B and block C, when other cores of the multi-core processor and the operation core try to access a same memory address (i.e., the address of the cache occupied by the operation core) and at least one write operation needs to be executed or when the space of the cache is insufficient and the cache is replaced, all operations, which have been executed by the operation core, may be aborted and block B and block C may be re-executed.

With the above scheme, storing the plaintext private key and intermediate variables in the cache may prevent physical attacks, such as the cold boot attacks. When multiple cores simultaneously access a same memory address, the operation core may execute an abort operation. That is, the operation core may abort all previous operations and re-execute all operations, which may have been executed. Therefore, the other cores need not to be configured as the no-fill mode, so that multiple cores may simultaneously execute the cryptographic operation to improve the efficiency of the multi-core processor and prevent the system attacks.

For instance, when the block B and block C are executed, the multi-core processor may dynamically record all memory accesses in the execution process of the block B and block C. A determination as to whether other threads of the multi-core processor and the operation core simultaneously access a same memory address and at least one write operation is executed may be made according to all the memory accesses recorded. Alternatively, a determination as to whether the space of the cache is enough may be made according to the record of all the memory accesses.

Figure 2:
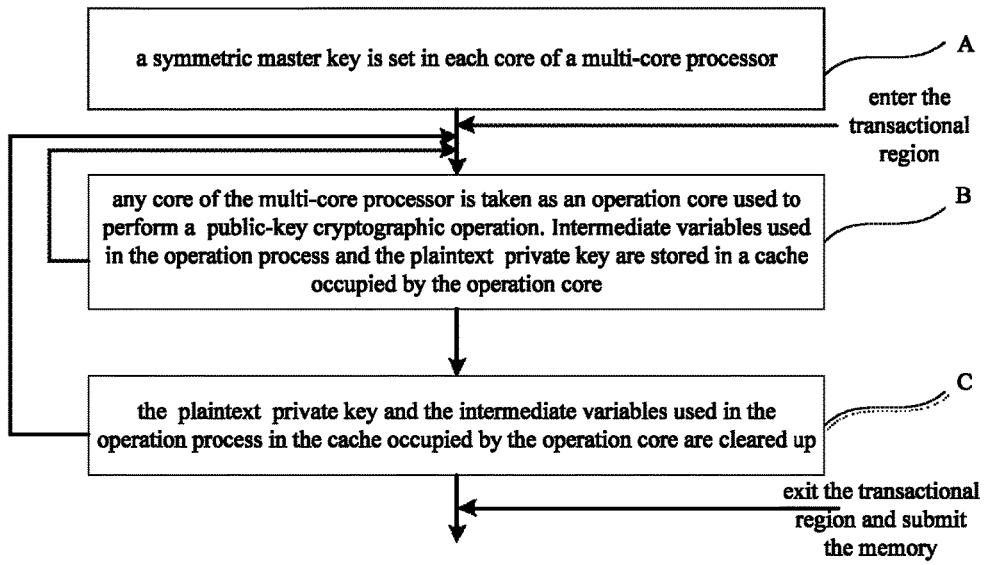
FIG. 2 is a flow chart illustrating another key protection method in accordance with an example of the present disclosure.
Figure 3:
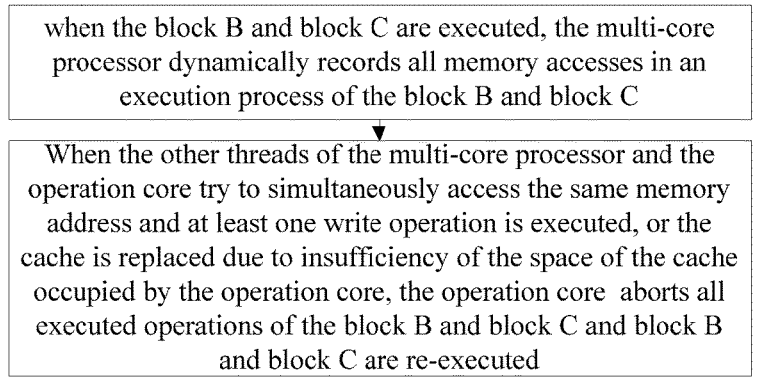
FIG. 3 is a flow chart illustrating a method for setting a transactional region and actions when memory access conflict occurs in accordance with an example of the present disclosure.

Specifically, an embodiment of the present disclosure provides a key protection method, which may effectively resist physical attacks and system intrusions, shown in FIG. 2 and FIG. 3. The method may include following blocks.

At block A, each core of the multi-core processor may be configured to contain a symmetric master key (i.e., the symmetric master key may be set in each core of the multi-core processor).

At block B, any core of the multi-core processor may be taken as an operation core. An decryption operation may be performed to obtain a plaintext private key using the symmetric master key. The public-key cryptographic operation may be performed using the plaintext private key. The plaintext private key and intermediate variables used in the operation process may be stored in the cache occupied by the operation core.

At block C, the plaintext private key and the intermediate variables used in the operation process in the cache occupied by the operation core may be cleared up.

When the block B and block C are executed, the multi-core processor may dynamically record all memory accesses in the execution processes of the block B and block C.

When the other threads of the multi-core processor and the operation core (or operation thread) try to simultaneously access the same memory address and at least one write operation is executed, or the cache is replaced due to insufficiency of the space of the cache occupied by the operation core, the operation core may abort all executed operations of the block B and block C (i.e., the operation core may abort all executed operations) and block B and block C may be re-executed until the block B and block C are finished. An operation may be performed to exit from the transactional region and submit the memory.

In order to better describe the present disclosure, an example that the Intel Haswell processor performs the RSA public-key cryptographic operation may be given hereinafter. In this example, the processor may be a four-core Intel Core i7 4770S. The used RSA algorithm may be implemented with Chinese Remainder Theorem (CRT) acceleration, Montgomery mode multiply acceleration and sliding window. Size of the sliding window may be 32 and the maximum memory used in the RSA computation may be 4708 bytes.

First, block A may be executed to make each core of the multi-core processor contain the symmetric master key. Block A may include following blocks.

Figure 4:
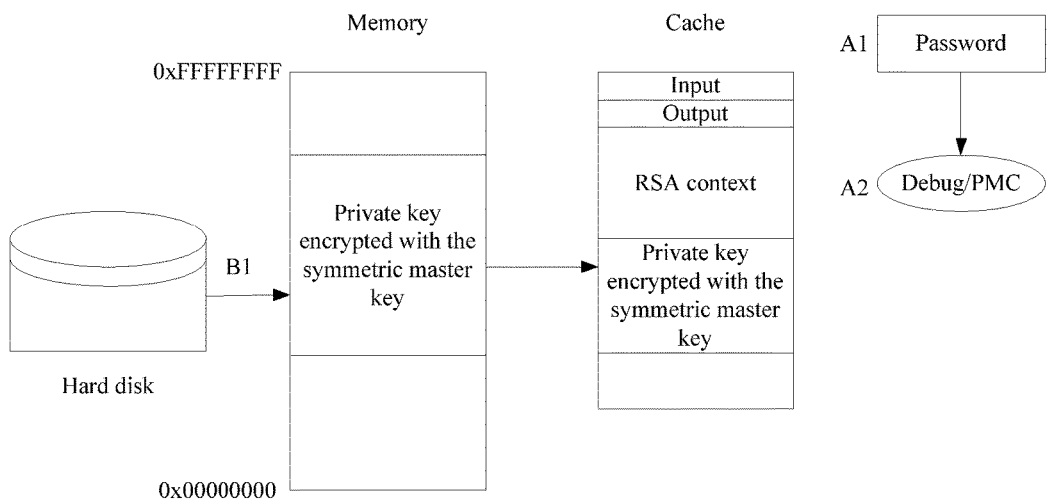
FIG. 4 is a flow chart illustrating setting a symmetric master key in each core and a public-key cryptographic operation in accordance with an example of the present disclosure.

As shown in FIG. 4, at block A1, when the OS boots, a prompt interface may pop up and a user may input a password. The OS may convert the password into the symmetric master key via a key generation algorithm.

At block A2, the symmetric master key may be copied to the specified registers of the multi-core processor, which may facilitate the public-key cryptographic operation. The specified registers may be debug registers or Performance Monitor Counter (PMC) registers.

Then, block B may be performed. Any core may be taken as the operation core to execute the public-key cryptographic operation. The plaintext private key and the intermediate variables in the operation process may be stored in the cache occupied by the operation core. The public-key cryptographic operation may include: a plaintext private key obtaining operation and a private-key computation operation.

Figure 5:
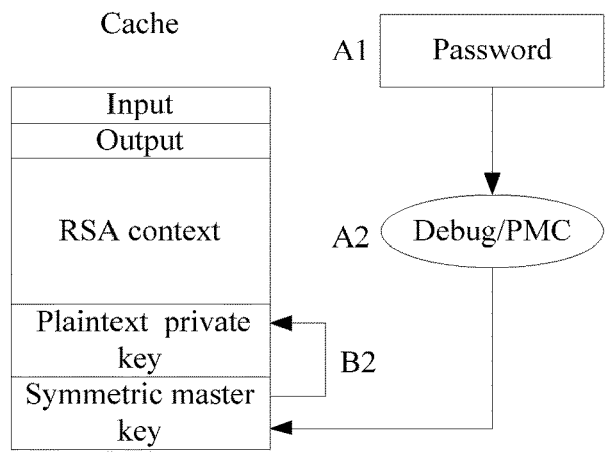
FIG. 5 is a flow chart illustrating a plaintext private key obtaining operation in accordance with an example of the present disclosure.

When the plaintext private key obtaining operation is performed, referring to FIG. 4, at block B1, the operation core may read the private key encrypted with the symmetric master key from the hard disk and copy the private key to the memory. The operation core may decrypt the private key, which is encrypted with the symmetric master key with the symmetric master key stored in the specified registers of the multi-core process to obtain the plaintext private key and store the plaintext private key in the cache occupied by the operation core. In the above process, in this example, as shown in FIG. 5, at block B2, the symmetric master key in the debug register or the PMC register may be written into the cache. The private key encrypted with the symmetric master key may be decrypted using the SSE register via calling Advanced Encryption Standard-New Instruction (AES-NI) instructions and the plaintext private key may be copied to the cache.

Figure 6:
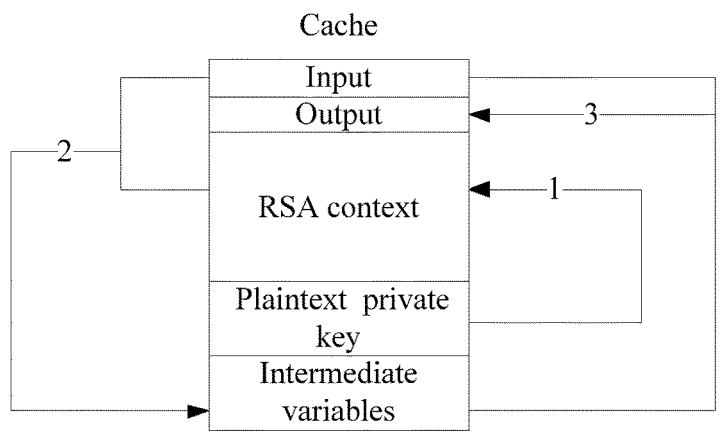
FIG. 6 is a flow chart illustrating a private-key computation operation in accordance with an example of the present disclosure.

When the private-key computation operation is performed, as shown in FIG. 6, at block 1, the operation core may perform digital signature and/or decryption operation with the plaintext private key. At block 2, intermediate variables generated in the computation process may be stored in the cache occupied by the operation core. At block 3, the computation result may be stored in the cache occupied by a running core.

Figure 7:
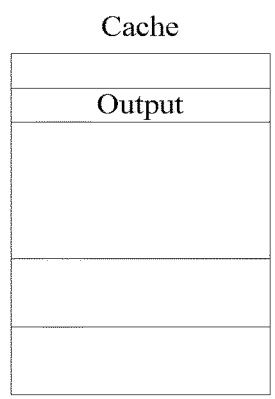
FIG. 7 is a flow chart illustrating clearing up the plaintext private key and intermediate variables in a cache in accordance with an example of the present disclosure.

Finally, block C may be executed. Referring to FIG. 7, the plaintext private key and the intermediate variables used in the operation process in the cache occupied by the operation core may be cleared up and only the operation result may be kept.

When the block B and block C are executed, the multi-core processor may dynamically record all memory accesses in the execution process of the block B and block C.

When other threads and the operation core of the multi-core processor try to simultaneously access a same memory address and at least one write operation is executed, or the cache is replaced due to insufficiency of the space of the cache occupied by the operation core, the operation core may abort all executed operations of the block B and block C and block B and block C may be re-executed.

Codes corresponding to the block B and block C may be specified as the transactional region via transactional memory mechanism, such as Intel TSX mechanism. After entering the transactional region, the multi-core processor may dynamically record all memory accesses of the codes in the transactional region. In other words, all memory accesses in the execution process of the block B and block C may be recorded. Specifically, with the RTM of the Intel TSX mechanism, when there may be memory access conflict between the other threads of the multi-core processor and all memory accesses dynamically recorded by the multi-core processor or when the data may need to be synchronized to the memory due to the insufficiency of the cache occupied by the operation core, the operation core may abort all executed operations of the block B and block C and re-execute the block B and block C.

It can be seen that when the memory access conflict occurs or the space of the cache is insufficient, the operation core may abort the operations and jump to a specified code region. Therefore, all memory write operations in the cryptographic operation process may occur in the cache only, which may prevent synchronization of the data from the cache to the memory and prevent the cold boot attacks. Further, when the other cores read the private key, re-execution may occur and the key information cannot be obtained. The present disclosure may not limit other processes in the multi-core processor to use the cache and may support that each core in the multi-core processor may use a different cryptographic operation to enhance efficiency of the multi-core processor.

Further, in order to increase a success rate of the public-key cryptographic operation as much as possible, before performing block B, i.e., before entering into the transactional region, this example may further include prohibiting OS process scheduling and disabling local interrupts. After clearing up the data in the cache occupied by the operation core, i.e., after exiting from the transactional region, the OS process scheduling and the local interrupts may be enabled. The OS process scheduling may be prohibited and the local interrupts may be disabled via clearing up an Interrupt Flag (IF) bit of the EFLAGS register of the multi-core processor and the OS process scheduling and the local interrupt may be enabled by setting the IF bit of the EFLAGS register of the multi-core processor.

Since the setting of the transactional region and subsequent processing utilize the Intel TSX technology, all memory accesses of the codes (i.e., the codes corresponding to the plaintext private key obtaining operation and private-key computation operation) in the transactional region may be recorded. If memory accesses of other non-operation cores conflict with the memory access recorded in the transactional region, abort may occur. The operation core may abort the previous operations. The state of the operation core may be restored to that before entering into the transactional region. The operation core may jump to the specified code region (when the RTM is used). Therefore, after entering into the transactional region, i.e., starting to execute the block B and block C, all memory write operations of the operation core occur in the cache of the operation core, so that the plaintext private key used in the whole key protection process and the intermediate variables generated in the operation process will not be synchronized to the memory from the cache occupied by the operation core. Further, the running speed of the non-operation cores may not be affected with the Intel TSX mechanism.

Further, since the operation core may use the SSE register and the general-purpose register in the operation process, when the plaintext private key and the intermediate variables used in the operation process in the cache occupied by the operation core are cleared up, data in the SSE register and general-purpose register may also be cleared up. In this example, the data in the cache occupied by the operation core may be cleared up with the memset function and the data in the SSE register and general-purpose register may be cleared up with the XOR instruction.

Further, in order to avoid that the processes of the non-operation core may frequently access the memory addresses accessed by the transactional region, which may lead to frequent aborts in the transactional region codes, the present disclosure may preferably reserve a memory region accessed by the block B and block C for each core in the multi-core processor before executing the block B, i.e., before entering the transactional region. So that each core of the multi-core processor may access a fixed memory region via reserving the memory region, the conflict between the memory accesses of the other cores and the operation core transactional region may be avoided and the plaintext private key obtaining operation and private-key computation operation may be successfully carried out.

In conclusion, with the key protection method provided in the present disclosure, the symmetric private key in plain text may be decrypted dynamically via making each core of the multi-core processor contain one symmetric master key. Further, in terms of the hardware, it may be ensured that the private key and the intermediate variables used in the computation process may be stored in the cache occupied by the core only via the Intel TSX. It may be prevented that the attacker may directly steal the private-key information from the physical memory or read the private-key information via malwares, so that the security of the implementation of public-key cryptographic algorithm in the computer system may be ensured. Further, the other cores of the multi-core processor may perform the cryptographic operations with the Intel TSX mechanism to improve the operation efficiency.

Figure 8:
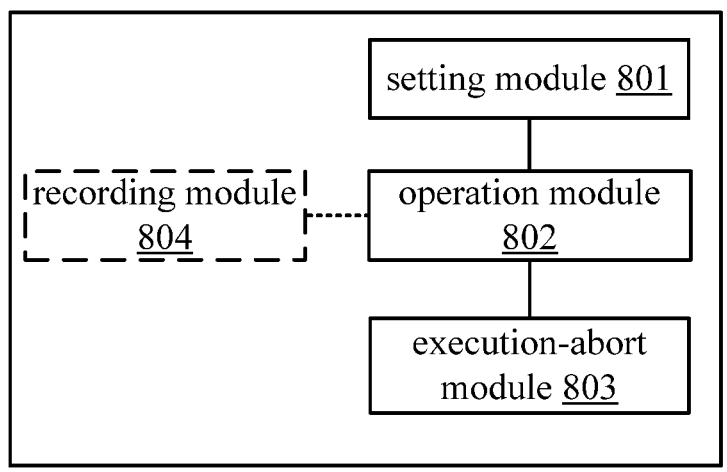
FIG. 8 is a schematic diagram illustrating a key protection device in accordance with an example of the present disclosure.

FIG. 8 is a schematic diagram illustrating the structure of a key protection device in accordance with an example of the present disclosure. The key protection device 800 may include: a setting module 801, an operation module 802 and an execution-abort module 803.

The setting module 801 may be to execute step A of setting a symmetric master key in each core of the multi-core processor.

The operation module 802 may be to execute step B of taking any core of the multi-core processor as the operation core, performing a public-key cryptographic operation according to the symmetric master key set by the setting module 801. The plaintext private key and the intermediate variables used in the public-key cryptographic operation may be stored in the cache occupied by the operation core. The operation module 802 may further execute step C of clearing up the plaintext private key and the intermediate variables in the cache occupied by the operation core.

The execution-abort module 803 may be to enable, in the process of executing the step B and step C, the operation module 802 to abort all executed operations and to re-execute the step B and step C when another core and the operation core of the multi-core processor try to access a same memory address and at least one write operation is executed, or when the cache is replaced due to insufficiency of space of the cache.

The key protection device 800 may execute the steps in the method examples shown in FIG. 1 to FIG. 7, which will not be described here in detail to avoid repetition.

As an example, the multi-core processor 800 may further include a recording module 804. The recording module 804 may be to record all memory accesses dynamically in the process of executing the step B and step C when the operation module 802 executes the step B and step C. The operation module 802 may be further to determine whether another core and the operation core of the multi-core processor may simultaneously access the same memory address and at least one write operation may be executed according to all the memory accesses recorded by the recording module 804; or determine whether the space of the cache may be sufficient according to all the memory accesses recorded by the recording module 804.

Further, the execution-abort module 803 may be to enable the operation module 802 to abort all the executed operations and to enable the operation module 802 to re-execute the step B and step C via transactional memory mechanism (such as the Intel TSX) when another thread and the operation core of the multi-core processor try to access the same memory address and at least one write operation is executed or when the cache is replaced due to insufficiency of the space of the cache. Further, the execution-abort module 803 may be to enter a transactional region via begin instructions (such as xbegin instruction) in the Restricted Transactional Memory (RTM) mechanism of the Intel TSX and specify beginning of the step B executed by the operation module 802 as a fallback address when threads of other cores and the operation core of the multi-core processor try to access the same memory address and at least one write operation is executed or specify the beginning of the step B executed by the operation module 802 as the fallback address when the cache is replaced due to insufficiency of the space of the cache occupied by the operation core and exist the transactional region via end instructions (such as xend instruction) when execution of the step C is finished by the operation module 802.

With the above scheme, when the memory access conflict occurs or the space of the cache is insufficient, the operation core may abort the operations and jump to a specified code region. Therefore, all memory write operations in the cryptographic operation process may occur in the cache only, which may prevent synchronization of the data from the cache to the memory and prevent the cold boot attacks.

Further, when the other cores read the private key, re-execution may occur and the key information cannot be obtained. The present disclosure does not limit the threads of other cores of the multi-core processor to use the cache and each core in the multi-core processor may use a different cryptographic operation to enhance efficiency of the multi-core processor.

Figure 9:
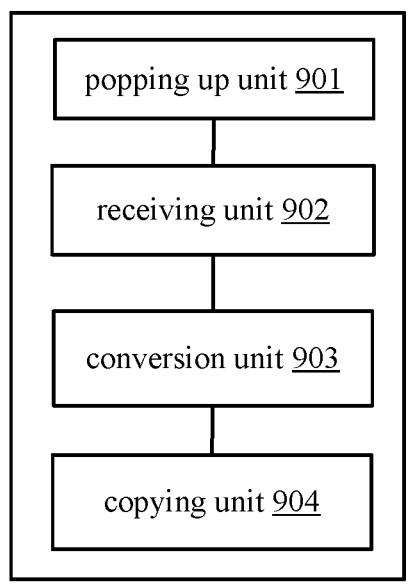
FIG. 9 is a schematic diagram illustrating a setting module in the key protection device in accordance with an example of the present disclosure.

As another example, as shown in FIG. 9, the setting module 801 may include: a popping up unit 901, a receiving unit 902, a conversion unit 903 and a copying unit 904.

The popping up unit 901 may be to pop up a prompt interface when an OS boots.

The receiving unit 902 may be to receive a password input by a user in the prompt interface popped up by the popping up unit 901.

The conversion unit 903 may be to convert the password received by the receiving unit 902 into the symmetric master key via the OS adopting a key generation algorithm.

The copying unit 904 may be to copy the symmetric master key converted by the conversion unit 903 to the specified registers in the multi-core processor for storage.

Refer to the description regarding to the above methods for specific examples, which may not be repeated here.

As another example, the setting module 801 may be further to prohibit OS process scheduling and disable local interrupts before the operation module 802 executes the step B and enable the OS process scheduling and the local interrupts after the operation module 802 executes the step C. Therefore, the success rate of the public-key cryptographic operation may be improved.

Further, the setting module 801 may be further to prohibit the OS process scheduling and disable the local interrupts via clearing up the Interrupt Flag (IF) bit of the EFLAGS register of the multi-core processor and enable the OS process scheduling and local interrupts via setting the IF bit of the EFLAGS register of the multi-core processor.

Preferably, in order to avoid that processes of the non-operation cores may frequently access the memory addresses accessed by the transactional region, which may occur frequent aborts in the transactional region codes, the setting module 801 may be further to reserve a memory region accessed when the operation module 802 executes the step B and step C for each core in the multi-core processor. Via the reservation operation of the setting module 801, each core of the multi-core process may access a fixed memory region, so that the conflict between the memory accesses of other cores and the transactional region of the operation core may be avoided and the plaintext private key obtaining operation and private-key computation operation may be successfully executed.

Figure 10:
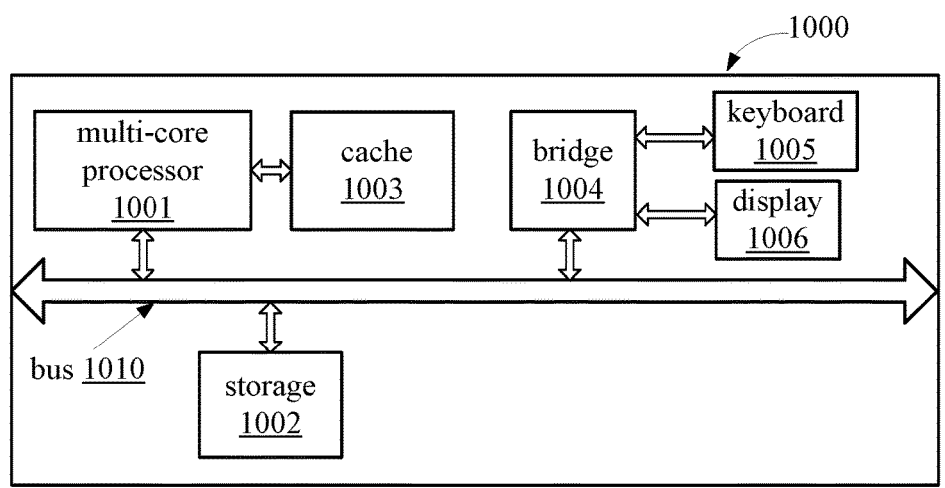
FIG. 10 is a schematic diagram illustrating another key protection device in accordance with another example of the present disclosure.

This example may provide a device for executing the blocks in the above method. FIG. 10 is a schematic diagram illustrating a key protection device. In this example, the key protection device 1000 may include a multi-core processor 1001 and a storage 1002. The multi-core processor 1001 may further be called a Central Processing Unit (CPU). The storage 1002 may include: a Read-Only Memory (ROM) and a Random Access Memory (RAM) and provide the multi-core processor 1001 with instructions and data. The storage 1002 may include a Non-Volatile Random Access Memory (NVRAM). The processor 1001 may couple with the storage 1002 with a bus system 1010. The bus system 1010 may include: a power bus, a control bus and a state signal bus besides data bus. For clarity, various buses in the figure may be labeled as the bus system 1010.

The methods in the above examples may be applied to the above key protection device 1000. The multi-core processor

1001 may be an integrated circuit chip with the signal processing ability. In the implementation process, each block of the above methods may be implemented via an integrated logic circuit of the hardware or instructions in software format in the multi-core processor 1001.

The multi-core processor 1001 may support Intel TSX and connect with a cache 1003. Sensitive information in the computation process may be stored in the device 1003.

When the system boots, a user interface may be popped up and a password may need to be input into the user interface. These operations may be implemented via a keyboard 1005 and display 1006 connected with a bridge device 1004. The bridge device may be a high-speed Northbridge, which may be used to connect with a graphic display card or may be used to connect with a peripheral, such as a keyboard by a Southbridge.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A key protection method, which is applied to a multi-core processor, comprising:
    step A, setting a symmetric master key in each core of the multi-core processor;
    step B, taking any core of the multi-core processor configured with the symmetric master key as an operation core, performing a decryption operation by the operation core to obtain a plaintext private key using the symmetric master key, performing an asymmetric cryptographic operation by the operation core using the plaintext private key; the plaintext private key and intermediate variables used in the asymmetric cryptographic operation being stored in a cache occupied by the operation core;
    step C, clearing up the plaintext private key and the intermediate variables used in the asymmetric cryptographic operation in the cache occupied by the operation core,
    wherein before the step B, the method further comprises: prohibiting OS process scheduling and disabling local interrupt, and
    after the step C, the method further comprises: enabling the OS process scheduling and enabling the local interrupt; and
    wherein the OS process scheduling is prohibited and the local interrupt is disabled via clearing up an Interrupt Flag (IF) bit of an EFLAGS register of the multi-core processor and the OS process scheduling and local interrupt is enabled via setting the IF bit of the EFLAGS register of the multi-core processor.

2. The method according to claim 1,
    wherein in a process of executing the step B and step C, when another core and the operation core of the multi-core processor try to access a same memory address and at least one write operation is executed, or when the cache occupied by the operation core is replaced due to insufficiency of space of the cache occupied by the operation core, all operations executed by the operation core are aborted and the step B and step C are re-executed.

3. The method according to claim 2, further comprising:
    recording all memory accesses dynamically in the process for executing the step B and step C when the step B and step C are executed;
    determining whether another core and the operation core of the multi-core processor simultaneously access the same memory address and at least one write operation is executed according to all the recorded memory accesses; or
    determining whether the space of the cache occupied by the operation core is sufficient according to all the recorded memory accesses.

4. The method according to claim 3, further comprising:
    specifying codes corresponding to the step B and step C as a transactional region via a transactional memory mechanism, so that the multi-core processor dynamically records all the memory accesses in the process for executing the step B and step C, aborts all the operations executed by the operation core and re-executes the step B and step C when another core and the operation core of the multi-core processor try to access the same memory address and at least one write operation is executed or when the cache occupied by the operation core is replaced due to insufficiency of the space of the cache occupied by the operation core.

5. The method according to claim 4, wherein the transactional memory mechanism comprises: Intel Transactional Synchronization Extensions (TSX); the method further comprises:
    entering the transactional region via begin instructions in a Restricted Transactional Memory (RTM) mechanism and specifying beginning of the step B as a fallback address when another core and the operation core of the multi-core processor try to access the same access memory address and at least one write operation is executed or specifying the beginning of the step B as the fallback address when the cache occupied by the operation core is replaced due to insufficiency of the cache occupied by the operation core, and exiting the transactional region via end instructions when execution of the step C is finished.

6. The method according to claim 1, wherein setting the symmetric master key in the each core of the multi-core processor in the step A comprises:
    popping up, by an Operating System (OS), a prompt interface and receiving a password input by a user in the prompt interface;
    converting, by the OS, the password into the symmetric master key adopting a key generation algorithm; and
    copying the symmetric master key to specified registers in the multi-core processor for storage.

7. The method according to claim 6, wherein the asymmetric cryptographic operation comprises: a plaintext private key obtaining operation and a private-key computation operation;
    the plaintext private key obtaining operation comprises: reading, by the operation core, a private key encrypted with the symmetric master key from a hard disk, copying the private key to a memory, decrypting, by the operation core, the private key encrypted by the symmetric master key in the specified registers in the multi-core processor to obtain the plaintext private key and storing the plaintext private key in the cache occupied by the operation core;
    the private-key computation operation comprises: a digital signature and/or decryption step, wherein the digital signature and/or decryption operation is executed with the plaintext private key, the method further comprises:

storing intermediate variables generated in the private-key computation operation and a computation result in the cache occupied by the operation core.

8. The method according to claim 7, wherein plaintext private key obtaining operation decrypts the private key encrypted with the symmetric master key using a Streaming Single Instruction Multiple Data (SIMD) Extension (SSE) register via calling Advanced Encryption Standard-New Instruction (AES-NI) instructions and copies the plaintext private key to the cache occupied by the operation core.

9. A key protection device, comprising a processor and a non-transitory storage, wherein the non-transitory storage is configured to store one or more instructions to be executed by the processor, and the one or more instructions comprise a setting instruction and an operation instruction; wherein
the setting instruction is to execute step A of setting a symmetric master key in each core of the multi-core processor;
the operation instruction is to execute step B of taking any core of the multi-core processor configured with the symmetric master key as an operation core, performing a decryption operation by the operation core to obtain a plaintext private key using the symmetric master key, performing an asymmetric cryptographic operation by the operation core using the plaintext private key; the plaintext private key and intermediate variables used in the asymmetric cryptographic operation being stored in a cache occupied by the operation core and further execute step C of clearing up the plaintext private key and the intermediate variables in the cache occupied by the operation core,
wherein the setting instruction is further to prohibit OS process scheduling and disable local interrupts before the operation instruction executes the step B and enable the OS process scheduling and the local interrupt after the operation instruction finishes execution of step C; and
wherein the setting instruction is to prohibit the OS process scheduling and disable the local interrupts via clearing up an Interrupt Flag (IF) bit of an EFLAGS register of the multi-core processor and enable the OS process scheduling and local interrupt via setting the IF bit of the EFLAGS register of the multi-core processor.

10. The device according to claim 9, wherein the one or more instructions further comprise an execution-abort instruction, wherein
the execution-abort instruction is to enable, in a process of executing the step B and step C, the operation instruction to abort all executed operations and to re-execute the step B and step C when another core and the operation core of the multi-core processor try to access a same memory address and at least one write operation is executed, or when the cache occupied by the operation core is replaced due to insufficiency of space of the cache occupied by the operation core.

11. The device according to claim 9 wherein the one or more instructions further comprise: a recording instruction;
the recording instruction is to record all memory accesses dynamically in the process for executing the step B and step C when the operation instruction executes the step B and step C;
the operation instruction is further to determine whether another core and the operation core of the multi-core processor simultaneously access the same memory address and at least one write operation is executed according to all the memory accesses recorded by the recording instruction; or determine whether the space of the cache occupied by the operation core is sufficient according to all the memory accesses recorded by the recording instruction.

12. The device according to claim 11, wherein the execution-abort instruction is to enable the operation instruction to abort all the executed operations and to enable the operation instruction to re-execute the step B and step C via a Transactional memory mechanism when another core and the operation core of the multi-core processor try to access the same memory address and at least one write operation is executed or when the cache occupied by the operation core is replaced due to insufficiency of the space of the cache occupied by the operation core.

13. The device according to claim 12, wherein the transactional memory mechanism comprises: an Intel Transactional Synchronization Extensions (TSX);
the execution-abort instruction is to enter the transactional region via begin instructions in a Restricted Transactional Memory (RTM) mechanism of the Intel TSX and specify beginning of the step B executed by the operation instruction as a fallback address when another core and the operation core of the multi-core processor try to access the same memory address and at least one write operation is executed or specify the beginning of the step B executed by the operation instruction as the fallback address when the cache occupied by the operation core is replaced due to insufficiency of the cache occupied by the operation core, and exit the transactional region via end instructions when execution of the step C is finished by the operation instruction.

14. The device according to claim 9, wherein the setting instruction comprises: a popping up instruction, a receiving instruction, a conversion instruction and a copying instruction;
the popping up instruction is to pop up a prompt interface when an OS boots;
the receiving instruction is to receive a password input by a user in the prompt interface popped up by the popping up instruction;
the conversion instruction is to convert the password received by the receiving instruction into the symmetric master key via the OS adopting a key generation algorithm; and
the copying instruction is to copy the symmetric master key converted by the conversion instruction to specified registers in the multi-core processor for storage.

* * * * *